United States Patent
Seal

(10) Patent No.: US 6,640,543 B1
(45) Date of Patent: Nov. 4, 2003

(54) INTERNAL COMBUSTION ENGINE HAVING VARIABLE DISPLACEMENT

(75) Inventor: Michael Ronald Seal, Bellingham, WA (US)

(73) Assignee: Western Washington University, Bellingham, WA (US)

( * ) Notice: Subject to any disclaimer, the term of this patent is extended or adjusted under 35 U.S.C. 154(b) by 0 days.

(21) Appl. No.: 09/960,836

(22) Filed: Sep. 21, 2001

(51) Int. Cl.⁷ .............................................. F02B 53/00
(52) U.S. Cl. .................. 60/609; 123/198 F; 123/559.1; 165/101; 60/599
(58) Field of Search ................... 60/609, 600, 605.1, 60/599; 123/559.1, 198 F, 41.21, 41.31; 165/101

(56) References Cited

U.S. PATENT DOCUMENTS

| | | | |
|---|---|---|---|
| 2,988,065 A | | 6/1961 | Wankel et al. |
| 2,990,161 A | * | 6/1961 | Blaskowski ................. 165/101 |
| 4,452,208 A | * | 6/1984 | Merlini et al. ............ 123/198 F |
| 4,488,531 A | * | 12/1984 | Tadokoro et al. ........ 123/559.1 |
| 4,494,503 A | | 1/1985 | Danno et al. |
| 4,550,568 A | | 11/1985 | Deutschmann et al. |
| 4,649,869 A | * | 3/1987 | Hayashi et al. .......... 123/41.21 |
| 4,738,309 A | * | 4/1988 | Schilling ................... 165/101 |
| 4,967,711 A | * | 11/1990 | Morikawa .................. 123/478 |
| 4,977,743 A | * | 12/1990 | Aihara et al. ............ 123/41.31 |
| 4,993,367 A | * | 2/1991 | Kehrer ........................ 165/101 |
| 5,033,268 A | * | 7/1991 | Hitomi et al. ........... 123/559.1 |
| 5,056,314 A | | 10/1991 | Paul et al. |
| 5,138,839 A | | 8/1992 | Hitomi et al. |
| 5,452,686 A | * | 9/1995 | Stahl .......................... 165/101 |
| 5,568,795 A | | 10/1996 | Robichaux et al. |
| 5,647,317 A | * | 7/1997 | Weisman et al. ........... 123/299 |
| 5,813,383 A | | 9/1998 | Cummings |
| 6,141,961 A | * | 11/2000 | Rinckel ....................... 60/288 |
| 6,158,218 A | | 12/2000 | Herold et al. |
| 6,244,256 B1 | * | 6/2001 | Wall et al. .............. 123/568.12 |
| 6,273,208 B1 | | 8/2001 | Sand |
| 6,276,138 B1 | * | 8/2001 | Welch ..................... 123/198 F |
| 6,499,298 B2 | * | 12/2002 | Uzkan .......................... 60/599 |

FOREIGN PATENT DOCUMENTS

| | | | | |
|---|---|---|---|---|
| GB | 2 143 580 A | * | 2/1985 | .................. 60/609 |
| JP | 359160027 A | * | 9/1984 | .............. 123/559.1 |
| JP | 363297733 A | * | 12/1988 | .............. 123/559.1 |
| JP | 401012025 A | * | 1/1989 | .............. 123/559.1 |
| JP | 2000064868 A | * | 2/2000 | .................. 60/609 |

* cited by examiner

Primary Examiner—Thomas Denion
Assistant Examiner—Thai-Ba Trieu
(74) Attorney, Agent, or Firm—Christensen O'Connor Johnson Kindness PLLC

(57) ABSTRACT

A variable displacement engine is provided with a group of variably operated cylinders which are controllable to start and stop operation under predetermined operating conditions, and a group of invariable operated cylinders which are constantly in operation irrespective of the operating condition. The engine is operably connected to a variable displacement control system operable to deactivate the operation of the group of variably operated cylinders under predetermined operating conditions, such as idling, highway cruising speeds, and the like, so that the overall fuel efficiency of the engine is improved. In an aspect of the present invention, a turbocharger is provided. The turbocharger includes an inlet for receiving exhaust gas from the invariable operated cylinders and an outlet for supplying compressed air to the variable operated cylinders. In one embodiment, the engine is a reciprocating piston type engine, and in another embodiment, the engine is a rotary piston type engine.

38 Claims, 13 Drawing Sheets

INTERNAL COMBUSTION ENGINE HAVING VARIABLE DISPLACEMENT

FIELD OF THE INVENTION

The present invention relates generally to internal combustion engines, and more particularly, to internal combustion engines having variable displacement.

BACKGROUND OF THE INVENTION

Automotive vehicle designers and manufacturers are constantly searching for ways to met or exceed the increasingly difficult EPA standards on fuel efficiency and exhaust emissions. One method that has been realized for years is the possibility of obtaining increased fuel efficiency and less emissions by operating an engine on less than its full complement of cylinders during certain operating conditions. Accordingly, during part-load operation, it is possible to save fuel by operating, for example, an eight cylinder engine on only four cylinders, or a six cylinder engine on only three cylinders. These engines are commonly referred to as variable displacement internal combustion engines.

One type of variable displacement engine known in the art is commonly referred to as the 4-6-8 variable displacement engine, and was sold by the Cadillac division of General Motors Corporation in the early 1980's. The 4-6-8 variable displacement engine utilizes a valve disabler system to disable the intake and exhaust valves of the inactive cylinders at part-load operation. This was typically accomplished by mechanically restricting the intake and exhaust valves of each inactive cylinder from opening. By disabling the valves, the valves remained in the closed position, thereby eliminating pumping losses.

While variable displacement engines have proven to significantly increase fuel economy and, consequently to reduce fuel emissions, variable displacement engines of the prior art have several deficiencies. First, the reciprocating pistons within the inactive cylinders generate friction as the pistons are continuously reciprocated during operation. Accordingly, the active cylinders must overcome the friction in the inactive cylinders, causing a reduction in the total power generated by the engine. In tests done on the 4-6-8 variable displacement engine, the engine only achieves approximately a fifteen percent (15%) increase in fuel efficiency when operating on only half of its cylinders due in part to the effects of friction between the pistons and the cylinder walls.

Additionally, when a cylinder has ceased operation for a considerable period of time, the temperature of the cylinder wall and other surfaces within the cylinder drop as compared to the continuously operating, fuel burning cylinders. The cooler, inoperative cylinders are required under various power needs to suddenly resume operation when power demand increases. This can cause combustion inefficiency compared with the continuously operated, warmer cylinders and brings about a lower average fuel burning efficiency and an increase in fuel consumption. Consequently, this results in higher pollution exhaust gases from the colder operating cylinders.

Therefore, there is a present need for a variable displacement engine which overcomes the deficiencies in the prior art.

SUMMARY OF THE INVENTION

The present invention provides a variable displacement internal combustion engine that addresses the deficiencies of the prior art. In accordance with aspects of the present invention, an internal combustion engine is provided. The engine includes a crankshaft, and a first cylinder that includes a first piston reciprocally movable within the cylinder to form a first working chamber. The first piston is operably connected to the crankshaft. The first cylinder also includes at least one intake port adapted to be connected in fluid communication with a source of air, and at least one exhaust port adapted to be connected to an exhaust manifold. The engine also includes a second cylinder that includes a second piston reciprocally movable within the second cylinder to form a second working chamber. The second piston is operably connected to the crankshaft. The second cylinder also includes at least one intake port and at least one exhaust port. The engine further includes a turbocharger operable for receiving exhaust gas from the first cylinder and operable for supplying compressed air to the second cylinder.

In one embodiment, the engine further includes means for controllably supplying fuel to the first and second working chambers, the means includes an engine control unit in communication with at least one sensor, and a fuel injection system in communication with the engine control unit. The fuel injection system is operable to deliver fuel to the second working chamber when the engine is operating in a part-load condition.

In accordance with another aspect of the present invention, an internal combustion engine having part-load and full-load operation is provided. The engine includes a first cylinder group which continuously operates during part-load and full-load operation, and a second cylinder group which operates during full-load operation but does not operate during part-load operation. The engine further includes a turbocharger having an inlet for receiving exhaust gas and an outlet for supplying compressed air. The turbocharger is operably arranged such that the inlet receives exhaust gas from the first cylinder group, and the outlet supplies compress air to the second cylinder group.

In accordance with yet another aspect of the present invention, an internal combustion engine is provided of the type having a first cylinder group, a second cylinder group, and means for controlling the operation of the first cylinder group and the second cylinder group such that the operation of the first and second cylinder groups are activated during full-load operation and the operation of the second cylinder group is deactivated during part-load operation. The improvement to the engine includes a turbocharger having an inlet for receiving exhaust gas and an outlet for supplying compressed air. The turbocharger is operably arranged such that the inlet receives exhaust gas from the first cylinder group, and the outlet supplies compress air to the second cylinder group.

In accordance with still another aspect of the present invention, a rotary engine is provided. The rotary engine includes an output shaft, and a first rotary unit that includes a first rotary housing defining a first cavity. A first rotor of substantial triangular shape is rotatably movable within the first rotary housing defining three working chambers. The rotor is operable to rotate with the output shaft. The rotary engine also includes a second rotary unit that includes a second rotary housing defining a second cavity. A second rotor of substantial triangular shape rotatably is movable within the first rotary housing defining three working chambers. The rotor is operable to rotate with the output shaft. The rotary engine further includes a turbocharger operable for receiving exhaust gas from the first rotary unit and operable for supplying compressed air to the second rotary unit.

In accordance with still yet another aspect of the present invention, an internal combustion engine is provided. The engine includes a first chamber operable for combustion, and a first piston movable within the first chamber. The engine also includes a second chamber operable for combustion, and a second piston movable within the second chamber. The engine further includes a turbocharger operable for receiving exhaust gas, and operable for supplying compressed air. The turbocharger is operably arranged such that the turbocharger receives exhaust gas from the first chamber, and supplies compress air to the second chamber.

In accordance with still another aspect of the present invention, an internal combustion engine is provided. The engine includes at least one first chamber operable for combustion and having at least one intake port and at least one exhaust port. A first piston is movable within the first chamber. The engine also includes at least one second chamber operable for combustion and having at least one intake port and at least one exhaust port. A second piston is movable with the second chamber. The engine also includes a turbocharger operable for receiving exhaust gas, and operable for supplying compressed air. The turbocharger is operably arranged such that the turbocharger receives exhaust gas from the first chamber, and supplies compress air to the second chamber. The engine further includes a variable displacement control system for controlling the operation of the first and second working chambers. The system operable to operate the first and second working chambers during full-load operation, and operable to operate only the first working chambers during part-load operation.

In accordance with still yet another aspect of the present invention, an internal combustion engine is provided. The engine includes at least one first chamber having at least one intake port and at least one exhaust port, and a first piston movable with the first chamber. The engine also includes at least one second chamber having at least one intake port and at least one exhaust port, and a second piston movable with the second chamber. A turbocharger is provided that is operable for receiving exhaust gas from the first chamber and operable to supply compressed air to the second chamber. The engine further includes a variable displacement control system for controlling the operation of the first and second working chambers during predetermined operating conditions, the system including an engine control unit in communication with at least one sensor operable to output a signal corresponding to engine operating conditions; and a fuel injection system in communication with the engine control unit. The fuel injection system is operable to deliver fuel to the second working chamber based on the signal of the sensor.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
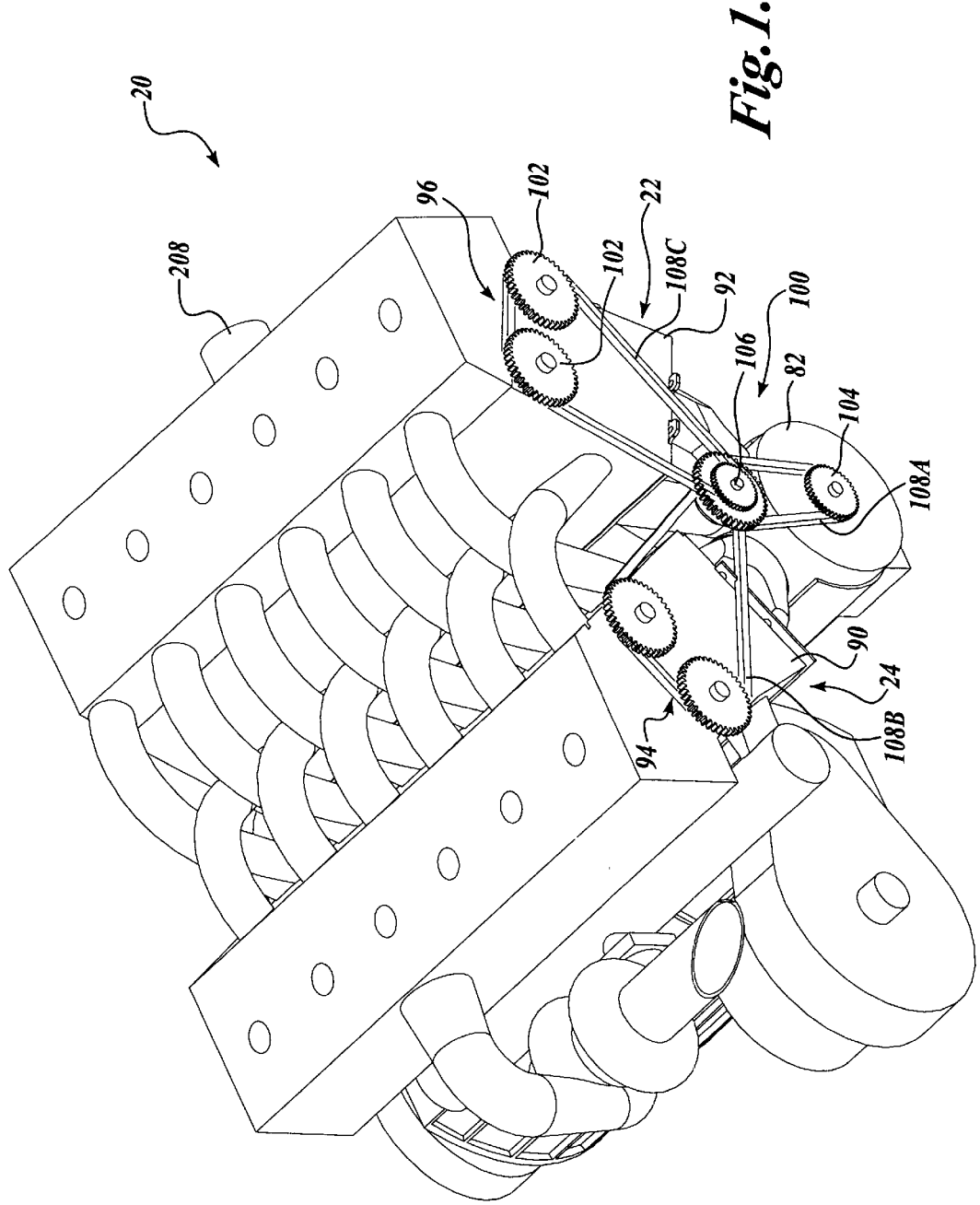
FIG. 1 is a perspective view of a variable displacement engine constructed in accordance with aspects of the present invention.
Figure 2:
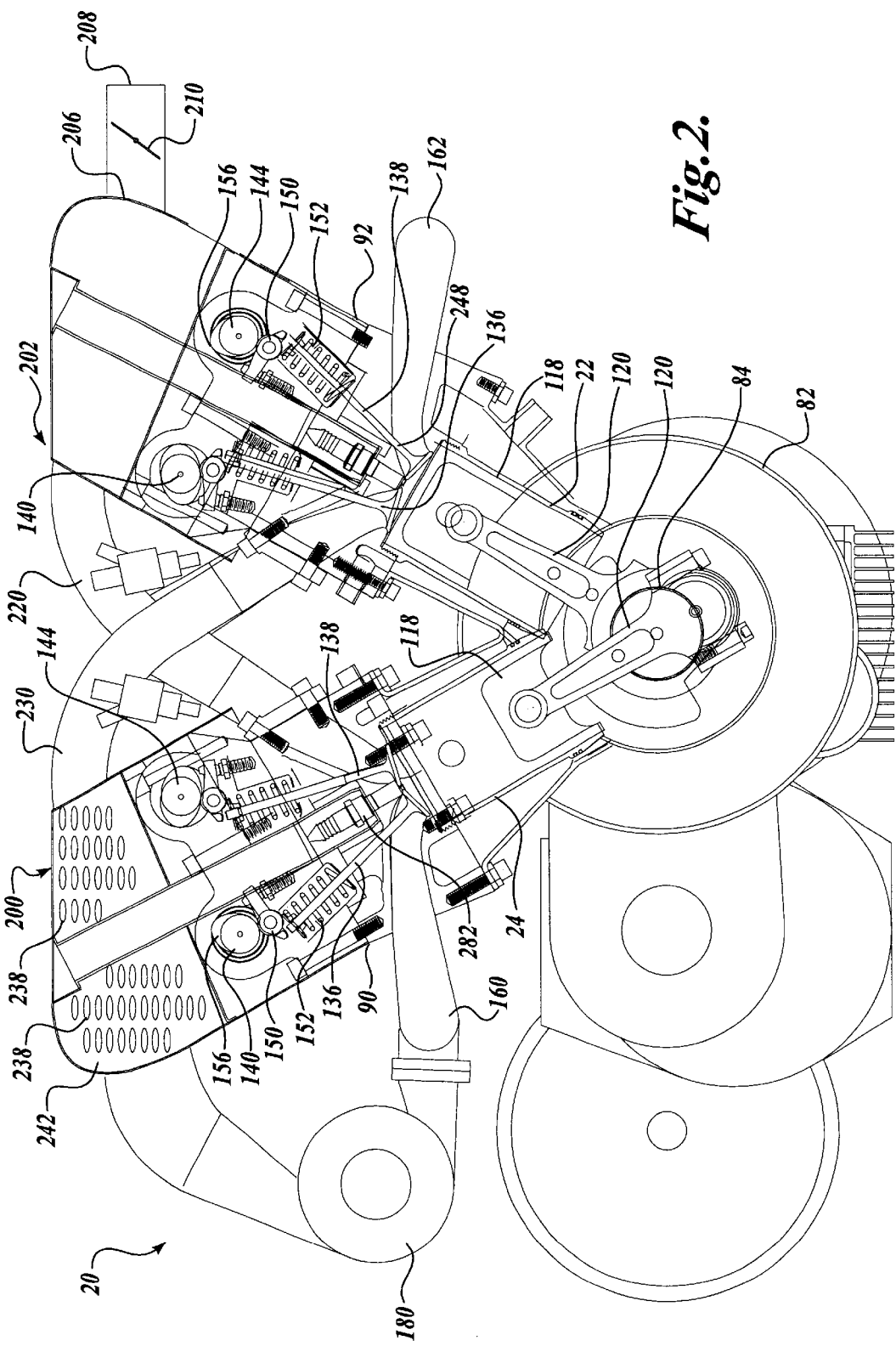
FIG. 2 is a cross-sectional view of the variable displacement engine of FIG. 1.

The present invention will now be described with reference to the accompanying drawings where like numerals correspond to like elements. The present invention is directed to an internal combustion engine having a unique configuration that allows the engine to operate with improved operational characteristics, including fuel efficiency. One suitable embodiment of an internal combustion engine having variable displacement, generally designated 20, constructed in accordance with the present invention is illustrated in FIGS. 1 and 2. The variable displacement engine 20 is provided with a group of variably operated cylinders 22 which are controllable to start and stop operation under predetermined operating conditions, and a group of invariable operated cylinders 24 which are constantly in operation irrespective of the operating condition. The engine 20 is operably connected to a variable displacement control system operable to deactivate the operation of the group of variably operated cylinders 22 under predetermined operating conditions, such as idling, highway cruising speeds, and the like, so that the overall fuel efficiency of the engine is improved.

Figure 7A:
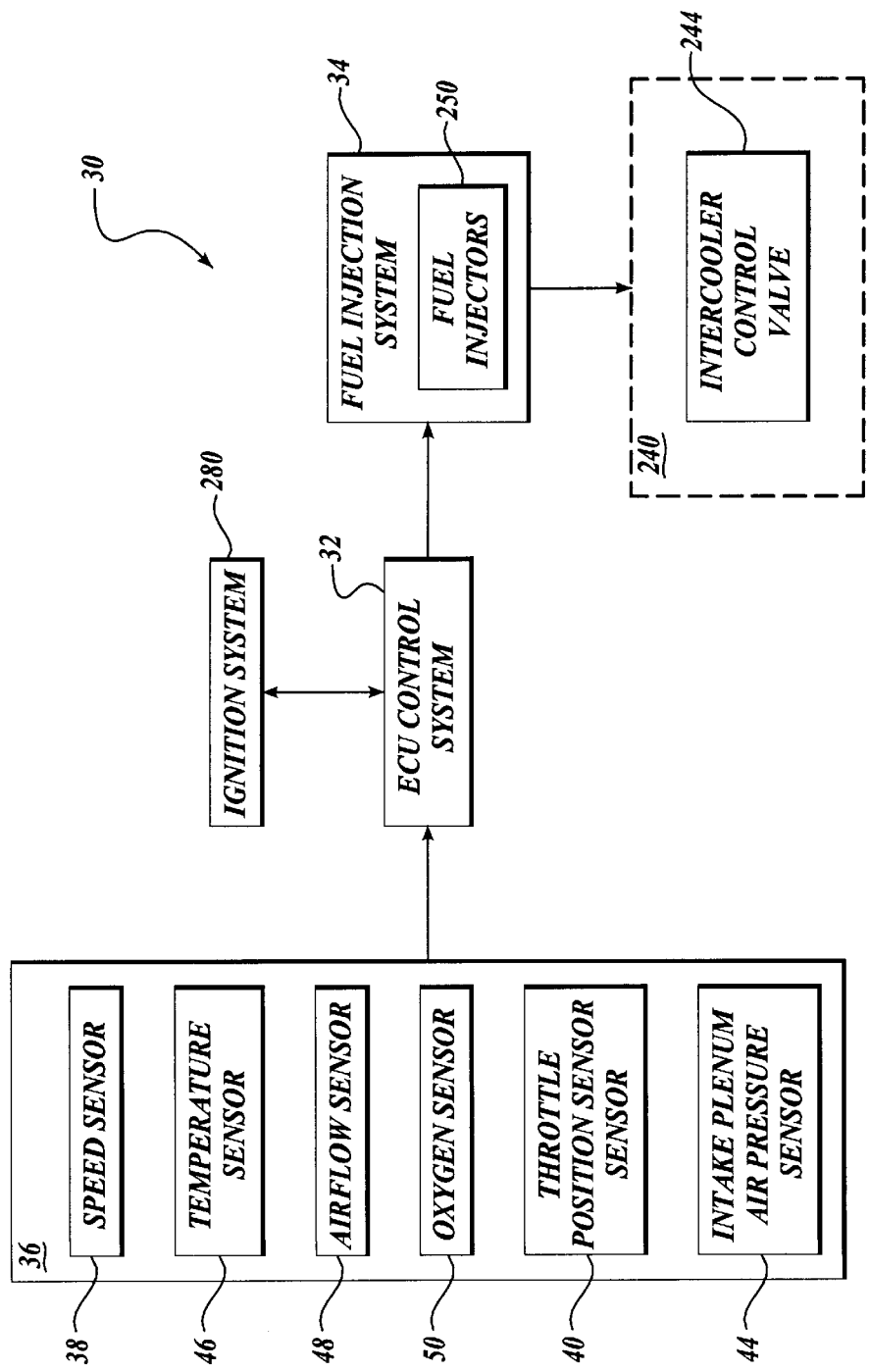
FIG. 7A is a block diagram of a variable displacement control system in accordance with aspect of the present invention.
Figure 7B:
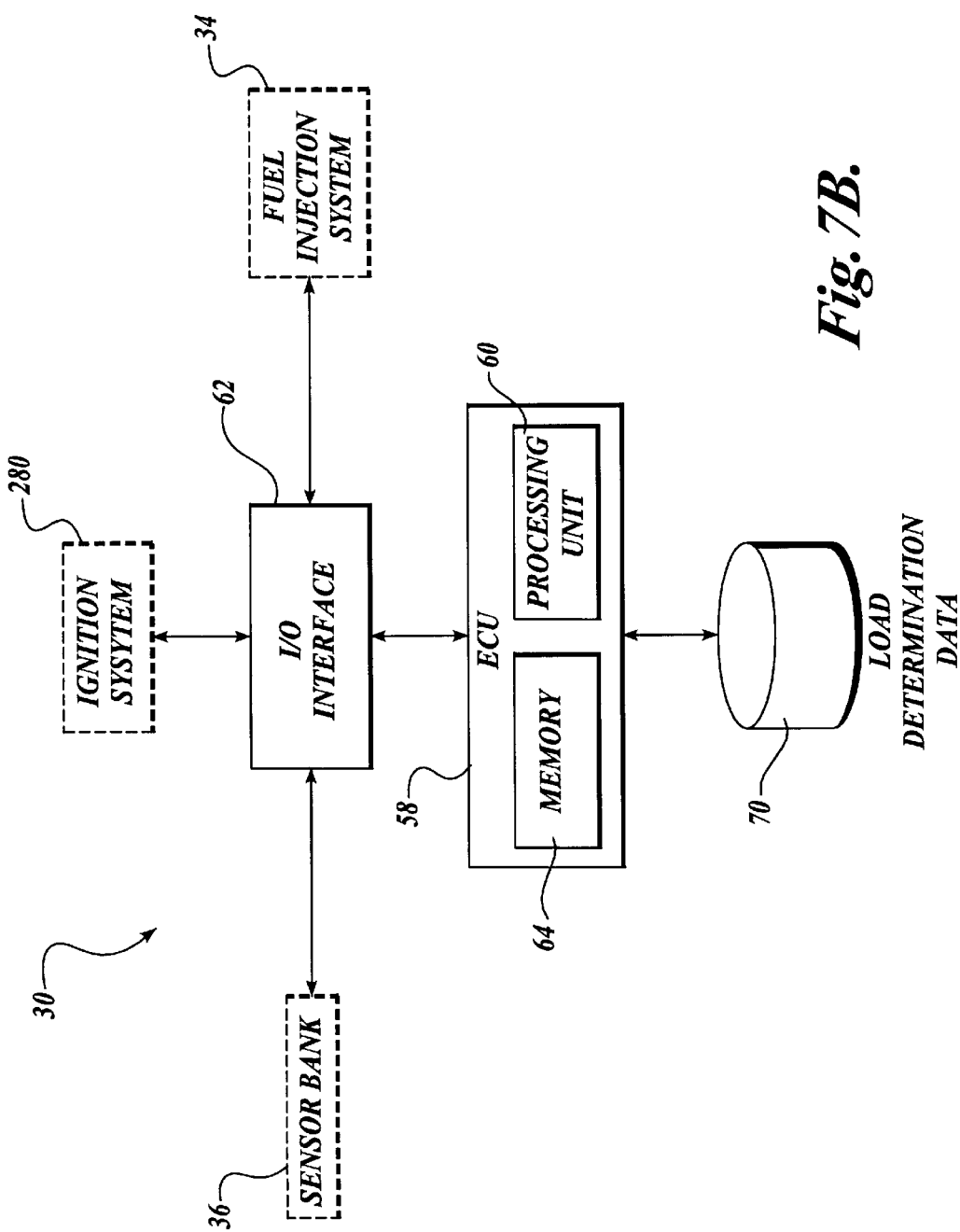
FIG. 7B is a block diagram of an ECU control system of the variable displacement control system shown in FIG. 7A.

Referring now to FIGS. 7A and 7B, an illustrative embodiment of an variable displacement control system 30 will be described. The variable displacement control system 30 is operable to deactivate the group of variably operated cylinders during part-load operation, and is operable to permit all cylinders to operate during full-load operation. Those of ordinary skill in the art will appreciate that the variable displacement control system 30 may include many more components than those shown in FIGS. 7A–7B. However, it is not necessary that all of these generally conventional components be shown in order to disclose an illustrative embodiment for practicing the present invention. As shown in FIG. 7A, the variable displacement control system 30 includes an engine control system 32, a fuel injection system 34, and a plurality of sensors 36. The plurality of sensors 36 are in communication with the engine control system 32 for providing signals to the engine control system that correspond to specific engine operating parameters. The plurality of sensors 36 may include an engine speed sensor 38 for sensing engine speed, a throttle position sensor 40 for sensing the position of the throttle valve, and an intake plenum air pressure sensor 44 for sensing intake plenum air pressure. The system 30 may further include other sensors for sensing other engine parameters such as an engine temperature sensor 46 for sensing engine temperature, an air flow sensor 48 for sensing air flow, an oxygen sensor 50 for sensing the quantity of oxygen present in the exhaust gas. The information from these sensors is utilized by the engine control system to control the operation of the engine, including the amount of fuel to be delivered by, the fuel injection system 34, if any, to the variable operated cylinder group of engine 20.

As best shown in FIG. 7B, the engine control system 32 includes an engine control unit 58 (ECU) having a processing unit 60, an I/O interface 62, and a memory 64, all connected via a communication bus, or other communication device. The ECU 58 may optionally include a display 66 for displaying the load condition, i.e.; part-load or full-load, of the engine 20. The I/O interface 62 includes hardware and/or software components known in the art that facilitates interaction with the plurality of engine sensors 36. The mass memory 64 generally comprises RAM and/or ROM for storing engine control information, such as limit values for various engine parameters, time-oriented data, and look-up tables for air/gas ratios, spark advancing, and the like. This information may be optionally stored in a storage device 70, such as a hard disk drive. The ECU 58 of the variable displacement control system 30 may further be utilized to operate the spark timing/control of an ignition system, air/fuel ratio control of an exhaust system, exhaust gas recirculation, intake airflow, and other engine and power transmission function, some of which will be described in more detail below.

Figure 8:
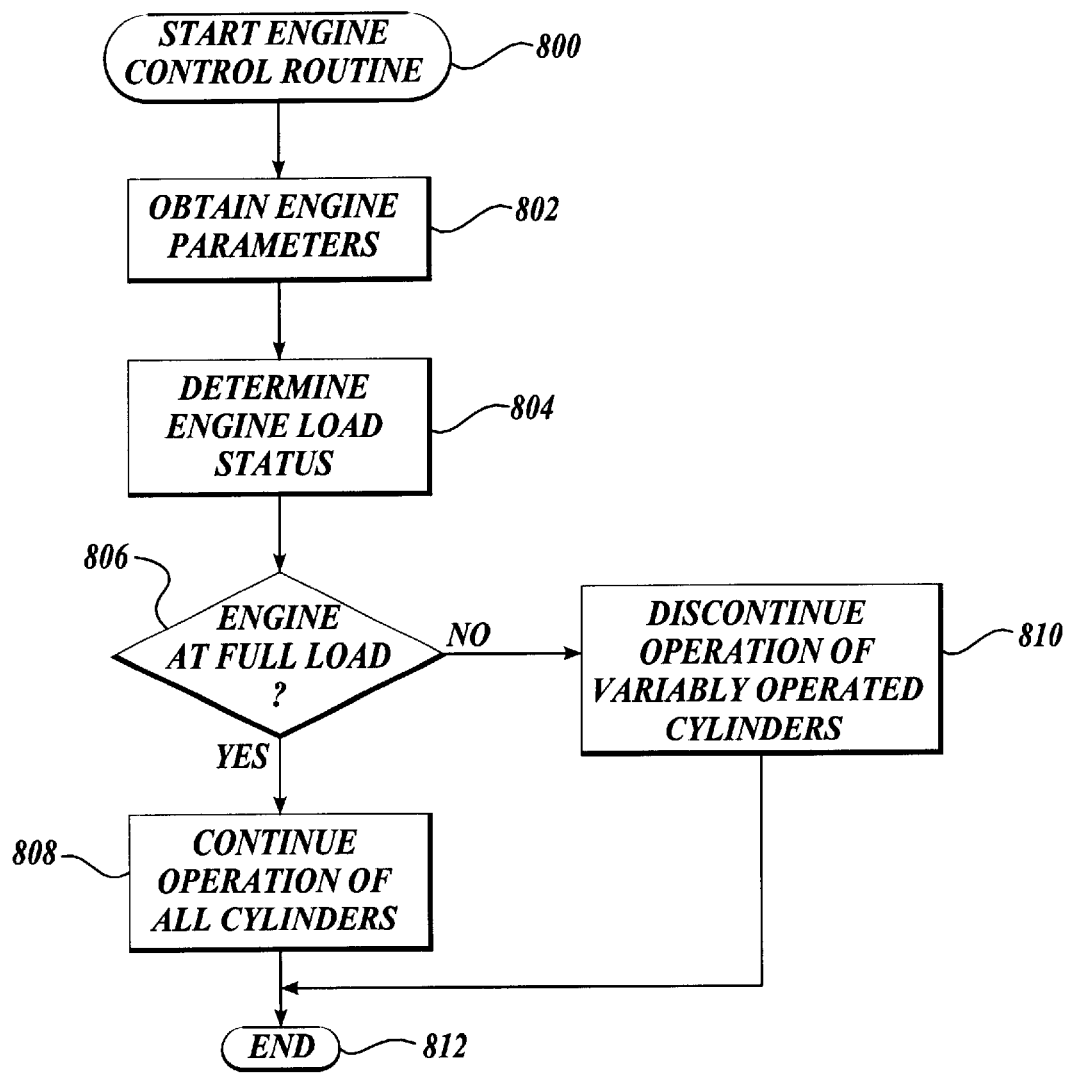
FIG. 8 is a flow diagram of the engine control routine implemented by the variable displacement control system of FIGS. 7A–7B.

Referring now to FIG. 8, a flow diagram of an illustrative engine control routine 800 will be described in accordance with the present invention, showing the operation of the variable displacement control system for deactivating the group of variably operated cylinders 22 during part-load operation, such as idling, highway cruise speeds, downhill descends, and the like. The routine 800 begins at block 802, where the processing unit 60 of the ECU 58 obtains data corresponding to specific engine operating parameters from the plurality of sensors 36. For example, the processing unit 60 may obtain data from the throttle position sensor 40 representative of the position of the throttle valve.

After the processing unit 60 of the ECU 58 obtains data corresponding to specific engine operating parameters, such as throttle position and/or intake plenum air pressure, the routine continues to block 804, where the ECU 58 determines the load status of the engine. In one embodiment of the present invention, the ECU 58 obtains data from at least one sensor of the plurality of sensors 36, and searches the look-up tables and/or the limit values stored in mass memory 66, or the optional storage 70. For example, full-load operation may be defined by limit values that correspond to specific engine operating parameter data values, such as throttle position. Full-load position may include, but is not limited to, acceleration and high torque demand, such as towing, up-hill driving, and the like. If the data from the throttle position sensor 40 is greater than the particular limit value (e.g., 30 degrees) for that sensor, the engine is determined to be in full-load operation. Additionally, full-load operation may be determined by look-up tables if the determination is based on an aggregate of different engine operating parameter data, such as throttle position and intake plenum air pressure.

While the example illustrates an embodiment that utilizes the throttle position sensor and/or the intake plenum air pressure sensor to determine if the load status of the engine, this should not be construed as limiting. One of ordinary skill in the relevant art will appreciated that the load determination may be based on any one or any combination of engine operating parameter data received from the sensors. Additionally, one skilled in the art will appreciate that any data processing and/or load determination algorithms known in the art may be utilized in practicing the present invention to determine whether the engine 20 is in part-load or full-load operation, and will not be further described in greater detail.

Then, at block 806, the data corresponding to the engine operating parameters is compared to the data in the look-up tables and/or the limit values to determine if the engine is currently operating under full-load conditions. If, at block 806, it is determined that the engine is operating at full load, the routine 800 proceeds to block 808 where the engine continues to operate on the full complement of cylinders. In one embodiment, the ECU 58 continues to transmit signals to the fuel injection system 34 to supply fuel to each cylinder in both groups of cylinders 22 and 24. The routine then ends at block 812.

Returning to block 806, if it is determined that the engine is not operating at full load, the routine proceeds to block 810, where the ECU 58 deactivates the variably operated cylinders 22 of the engine 20. In one embodiment, the ECU 58 does not transmit a representative signal to the fuel injection system 34 instructing the fuel injectors associated with each of the variably operated cylinders 22 to supply fuel to the cylinders. The routine ends at block 812.

Figure 3:
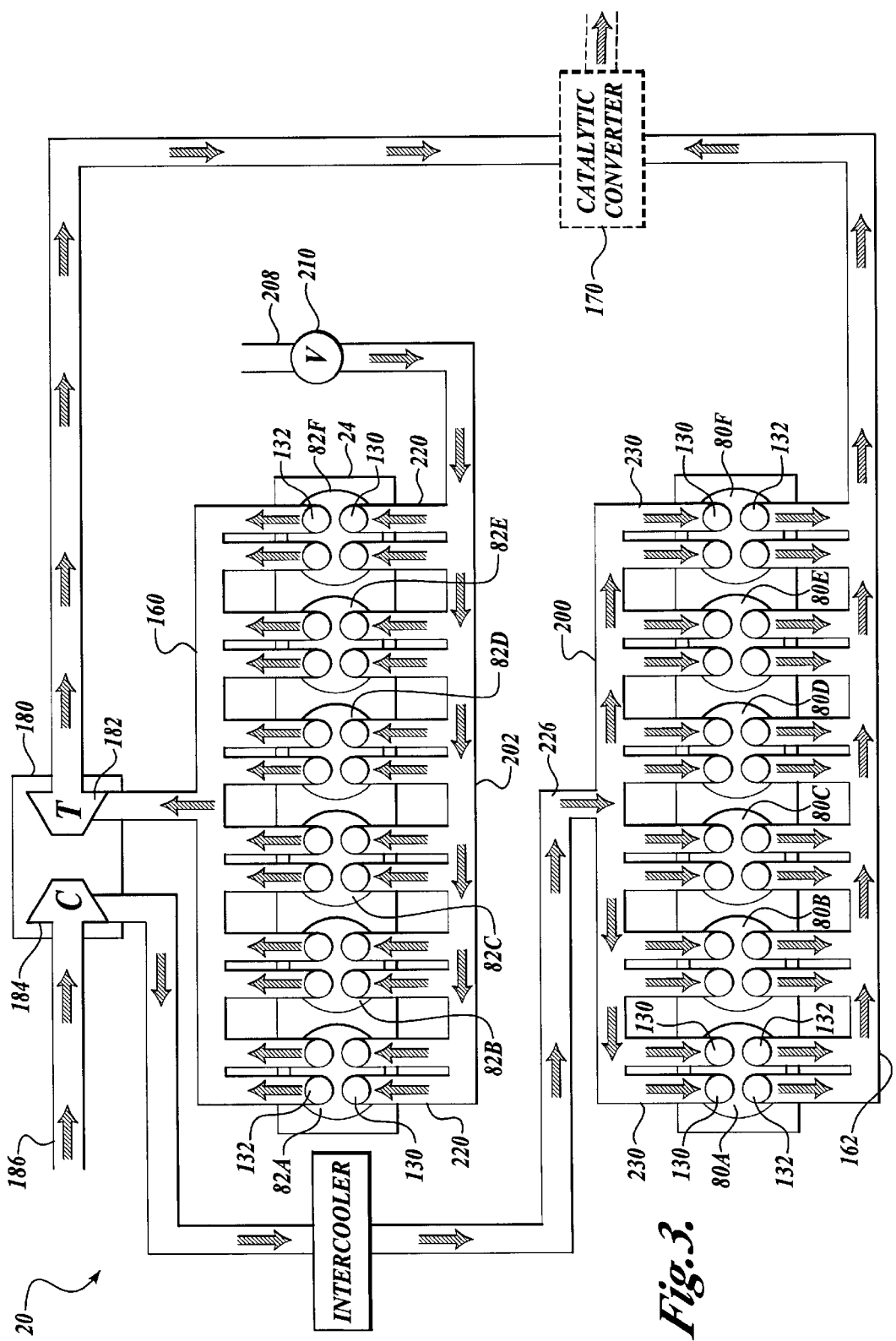
FIG. 3 is a schematic representation of the variable displacement engine of FIG. 1.

Referring now to FIG. 3, the engine 20 that is controlled via the variable displacement control system 30 (FIGS. 7A and 7B) will now be described in more detail. For clarity in the description and ease of illustration, FIG. 3 depicts schematically an engine 20 having a group of variably operated cylinders 22 and a group of invariably operated cylinders 24. The cylinders located in the group of variably operated cylinders are designated 80a–80f, and the cylinders located in the group of invariably operated cylinders are designated 82a–82f, respectively.

In the embodiment shown in FIGS. 1 and 2, the variably and invariably operated groups of cylinders are arranged so that the longitudinal axis of the respective cylinders intersect in a V, commonly referred to as a V-type configuration. Secured to the lower end of the groups of cylinders 22 and 24 is a crank case 82 having a crankshaft 84 disposed therein. The crankshaft 84 is adapted to connect to a transmission (not shown), as is well known in the art. An engine speed sensor 38 (FIG. 7A) is provided and is operable to output a signal corresponding to the speed of the crankshaft 84 to the ECU 58.

Mounted on the top surfaces of the invariably operated and variably operated groups of cylinders 24 and 22 in an air-tight fashion are first and second cylinder heads 90 and 92, respectively. First and second pairs of camshafts 94 and 96 are respectively supported on the first and second cylinder heads 90 and 92 in a dual overhead cam (DOHC) arrangement. Alternatively, the engine may have a first and second camshaft in a single overhead cam (SOHC) arrangement. The pairs of camshafts 94 and 96 are operatively connected at their front ends with the crankshaft 84 through a transmission 100 so that they are driven to rotate in synchronization with the rotation of the crankshaft 84. The transmission 100 comprises timing sprockets 102 fixedly mounted on the front ends of the pair of camshafts 94 and 96, a crank sprocket 104 fixed on the front end of the crankshaft 84, a jack shaft 106 rotatably mounted directly above the crank case 84, and timing chains 108a–108c entrained around the sprockets 104 and the jack shaft 106. Alternatively, as known in the art, timing pulleys and timing belts may also be used. One skilled in the art will appreciate that the pairs of cams 94 and 96 are driven at one-half the speed of the crankshaft 84 in order to supply one power stroke for every two revolutions of the crankshaft 84, for each piston.

As shown in FIG. 2, each cylinder disposed in the variably operated and invariably operated groups of cylinders 22 and 24 houses a piston 118 reciprocally driven by the crankshaft 84 via respective connecting rods 120. The cylinders 80a–80f and 82a–82f and the pistons 118 cooperate to form working chambers for the induction, compression, combustion, and exhaustion of the air/fuel mixtures. In one embodiment, working chambers of the invariably operated cylinders are operable to produce a compression ratio in the range of 6–9:1, and preferably 8.5:1, and the working chambers of the variably operated cylinders are operable to produce a compression ratio in the range of 9–12:1, and preferably 10.5:1.

As best shown in FIGS. 2 and 3, the top of each cylinder formed by the lower portion of the cylinder heads 90 and 92 includes intake ports 130 and exhaust ports 132. In the embodiment shown, two intake ports and two exhaust ports are in fluid communication with the top of each cylinder. The intake and exhaust ports 130 and 132 are opened and closed via respective valves 136 and 138, as best shown in FIG. 2. The valves 136 and 138 are reciprocally mounted within the cylinder heads 90 and 92 and actuated via the pairs of camshafts 94 and 96. Specifically, each pair of camshafts 94 and 96 includes an intake port camshaft 140 and exhaust port camshaft 144, which operate the intake valves 136 and exhaust valves 138 of the intake ports 130 and the exhaust ports 132, respectively.

The camshafts 140 and 144 are operably connected to each valve 136 and 138 via rocker arms 150 pivotally mounted within the cylinder heads 90 and 92. The valves 136 and 138 are normally biased via springs 152 to seal the intake and exhaust ports 130 and 132 in a closed position. The springs 152 are also operable to keep constant engagement between the top of each valve 136 and 138 and a pivoting portion of the respective rocker arm 150. As known in the art, cam lobes 156 on the camshaft 140 and 144 engage the pivoting portion of the rocker arm 150 against the biased valves 136 and 138, thereby reciprocating the valves downwardly to open the respective ports. One skilled in the relevant art will appreciate that an engine configured in the manner described above operates in a 4-stroke Otto cycle.

Referring to FIGS. 2 and 3, the engine 20 includes an exhaust system, which is adapted to connect to a catalytic converter 170. The exhaust system includes first and second exhaust manifolds 160 and 162 connected in air-tight fashion to the first and second cylinder heads 90 and 92 (FIG. 2), respectively. The first exhaust manifold 160 is connected in fluid communication with the exhaust ports 132 of invariably operated cylinder group 24. The first exhaust manifold 160 transports exhaust gas produced from combustion of an air/fuel mixture in the invariably operated group of cylinders 24 to a conventional turbocharger 180. The turbocharger 180 includes a turbine 182 in fluid communication with the first exhaust manifold 160 to receive exhaust gas. The turbine 182, driven by the exhausted gases, in turn, drives a compressor 184. Fresh air is taken in via air line 186, and is compressed via the compressor 184 of the turbocharger 180. The compressed air from the compressor 184 is supplied to the intake plenum of the variably operated cylinder group 22, as will be described in more detail below.

The second exhaust manifold 162 is connected in fluid communication with the exhaust ports 132 of the second cylinder head 92 of variably operated cylinder group 22. In the embodiment shown, the second exhaust manifold 162 transports exhaust gas produced from combustion of an air/fuel mixture in the working chambers of the variably operated cylinders 22 to a catalytic converter, when the engine is operating in full-load condition, as will be described in more detail below. The catalytic converter 170 also receives exhaust gas from the output side of the turbine 182 located at the turbocharger 180. Upstream oxygen sensors 50 (FIG. 7A), such as a heated exhaust gas oxygen (HEGO) sensors, positioned upstream of the catalytic converter 170, detects the oxygen content of the exhaust gas generated by the engine 20 and transmits a representative signal to the ECU 58. The oxygen sensor 50 provides a signal having a high state when air/fuel ratio operation is on the rich side of a predetermined air/fuel ratio, commonly referred to as stoichiometry (14.7 lbs. air/lb. fuel in this example). When the engine air/fuel operation is lean of stoichiometry, the oxygen sensor 50 provides its output signal at a low state. The signal is then used by the ECU 58 in controlling the amount of fuel delivered to the engine 20 by the fuel injection system 34, as will be described in more detail below. As is known in the art, the catalytic converter is adapted to connect in fluid communication to an exhaust passageway with so as to permit the exhausted gas to escape to the atmosphere through mufflers, exhaust pipes and the like.

Referring back to FIGS. 1 and 2, first and second intake plenums 200 and 202 are mounted on top of the first and second cylinder heads 90 and 92, respectively. As best shown in FIG. 1 and 3, the second intake plenum 202 includes an intake port 206 adapted to connect to a fresh air inlet 208, and the intake plenum air pressure sensor 44 positioned therein. Positioned within the fresh air inlet is a throttle valve 210 known in the art, which may be actuated by an accelerator pedal. The throttle valve 210 is monitored via a throttle position sensor 40, which is in communication with the ECU 58 for transmitting the throttle position (typically in degrees) to the ECU. The second intake plenum 202 also includes runners 220 that are connected in fluid communication with the intake ports 130 of the invariably operated cylinders 24. The runners 220 transmit fresh air from the fresh air intake port 206 to the invariably operated cylinders 24 to be mixed with fuel supplied by fuel injectors, and compressed via the reciprocating pistons 118.

The first intake plenum 200 includes an intake port 226 connected to fluid communication with the compressor output of the turbocharger 180. The first intake plenum 200 also includes runners 230 that are connected in fluid communication with the intake ports 130 of the variably operated cylinders 22. The runners 230 transmit fresh compressed air from the compressor 184 to the variably operated cylinders 22, which is compressed via the reciprocating pistons 118. The compressed air is mixed with gas supplied by fuel injectors during full load operation.

Figure 13:
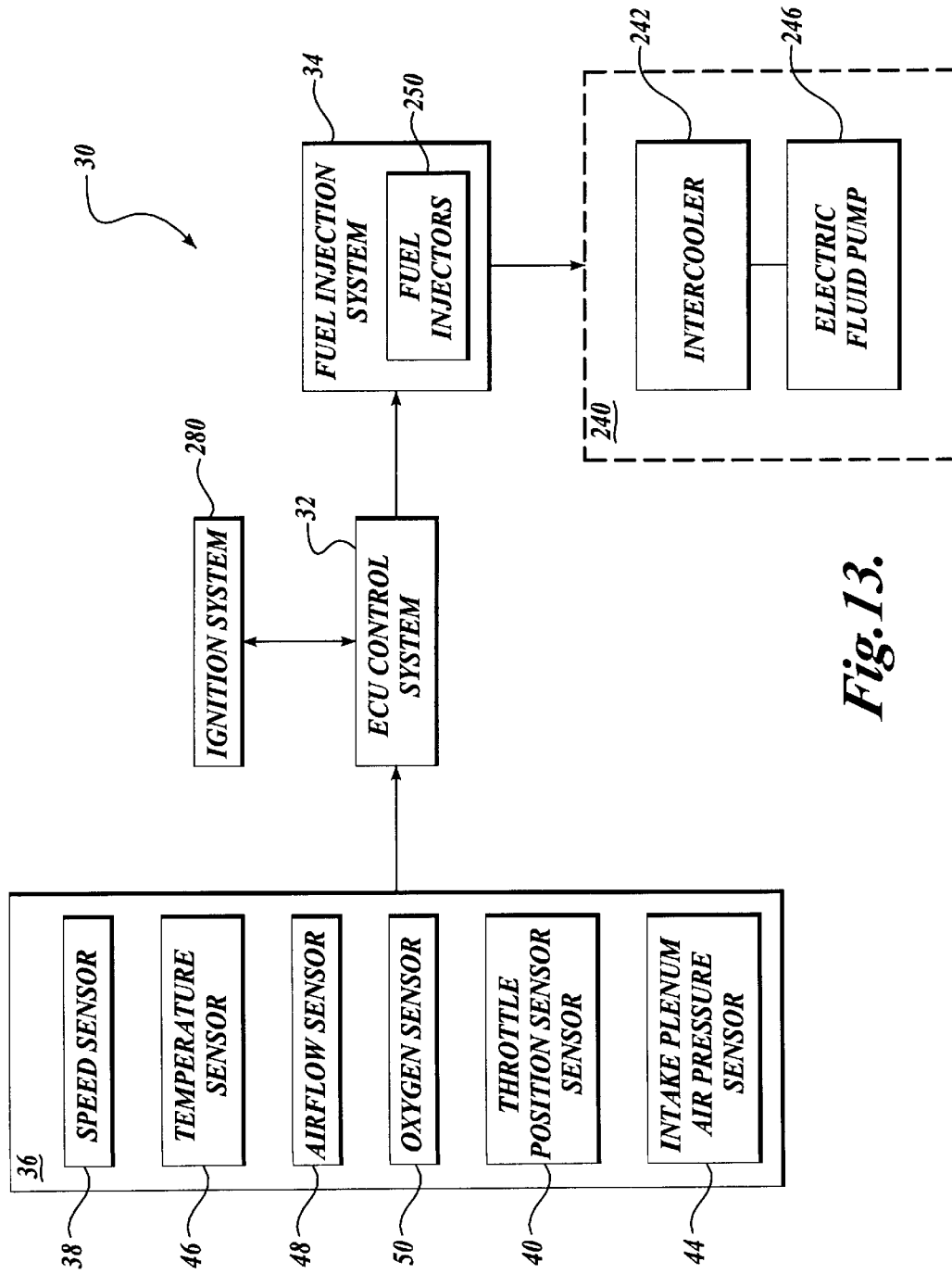
FIG. 13 is a block diagram of a variable displacement control system shown in FIG. 7A depicting an alternative embodiment of an engine cooling system.

In one embodiment of the present invention, the first intake plenum 200 includes tubes 238 (FIG. 2) connected to a cooling system 240 (FIG. 7A), preferably self-contained. The cooling system 240 recirculates fluid, such as water, coolant, or mixtures thereof, through the tubes 238 so that the tubes act as a heat exchanger to form an intercooler 242 for reducing the temperature of the compressed air supplied from the turbocharger 180. An inlet (not shown) connected to the tubes includes a control valve 244 (FIG. 7A), such as a solenoid valve, for controlling the flow of fluid through the tubes 238. Alternatively, the engine control system 240 may include an electric pump 246 for recirculating the fluid through the tubes 238, as shown in FIG. 13. In this embodiment, the electric pump 246 is connected in electrical communication with the fuel injector system 34. One skilled in the art will appreciated that the electric pump may also be directly connected to the ECU 58.

In part-load operation as described herein, the control valve 244 receives a signal from the fuel injection system 34 indicative of the state of the engine as illustrated in FIGS. 7A–7B. The control valve 244 closes based on the signal from the fuel injection system 34 so that the fluid in the tubes drain from the intercooler 242. During part-load operation in the alternative embodiment, the electric pump 246 receives a signal from the fuel injection system 34, or alternatively the ECU 58, to turn off or shut-down so that fluid in the tubes ceases to recirculate and eventually drains back to the fluid holding tank. Thus, minimal heat transfer occurs between the compressed air and the tubes. This is beneficial since heat energy generated by compressed air will not be lost to the system, and may be utilized to heat the variably operated cylinders 22, in conjunction with the friction between the piston and the variably operated cylinder walls, as will be described in more detail below. In an alternative embodiment, the intercooler 242 may be mounted separately from the first intake plenum 200.

Referring now to FIGS. 7A–7B, the cylinders of the engine receive fuel for combustion via the fuel injection system 34. As described above, the fuel injection system 34 of the variable displacement control system 30 is operated to supply fuel to all cylinders 22 and 24 during full-load operation, and operable to only supply the invariably operated cylinders 24 during part-load operation. The fuel injection system 34 includes conventional fuel injectors 250, two for each cylinder 80*a*–*f* and 82*a*–*f*, positioned within the cylinder heads 90 and 92 and connected to a pressurized fuel source (not shown). The fuel injectors 250 are operable to supply fuel to a supply of air to form a combustible mixture to be ignited within the working chambers of the cylinders. The fuel injectors 250 are in communication with the ECU 58 to receive signals corresponding to the quantity of fuel (in the form of a pulse width) to supply to each cylinder in a sequential multi-port fuel injected manner. The fuel injection system 34 may operate in conjunction with the oxygen sensors 50 connected to the exhaust system to adjust the air/fuel ratio for fuel efficiency and reduced emissions. The fuel injection system 34 is further operable to transmit a signal to the control valve of the intercooler, as briefly describe above.

The engine 20 is adapted to connect to an engine cooling system (not shown). The engine cooling system is a dual cooling system, the first system 262 is operable for reducing the operational temperature of the invariably operated cylinders 24, while the second system is operable for reducing the operational temperature of the variably operated cylinders 22. Each system includes a radiator filled with a predetermined quantity of coolant. The coolant is pumped via water pumps known in the art. The pumps may be driven via serpentine belts operably connected to the crankshaft.

The first cooling system 262 may be operable to supply coolant, if desired, to the intercooler briefly described above. The first and second cooling systems operably connect to the water jackets of the invariably and variably operated cylinders. The second cooling system is thermostat controlled such that during part-load operation coolant does not recirculate, causing minimal cooling of the cylinders.

In an alternative embodiment of the engine cooling system, the coolant can be electrically driven by electric pumps and controlled via the ECU. The electric pump in the second cooling system is adapted to receive a signal from the ECU, and therefore does not require thermostat control. Thus, in part-load operation, the ECU can transmit a signal to the electric pump instructing the pump to shut off. This will allow the fluid in the water jacket to drain to the radiator to create a substantially dry group of cylinders. Accordingly, heat generated by the friction of the moving pistons and the heat from the compressed air will be minimally lost to the second cooling system.

As best shown in FIG. 7A, the engine 20 may further include other systems known generally in the art, such as an ignition system 280, and an lubrication system (not shown). In one embodiment of the present invention, the ignition system 280 includes a coil and a distributor, not shown but well known in the art, for each group of cylinders, the distributors are driven via the exhaust camshafts. The ignition system 280 further includes a first and second set of spark plugs 282 and 284 (FIG. 2) in communication with the distributors, respectively, to deliver a spark to each cylinder. The first and second sets of spark plugs 282 and 284 (FIG. 2) are mounted within each cylinder of the groups of invariable and variable cylinders, respectively, as best shown in FIG. 2. In one embodiment, the spark advance maps located in the memory of the ECU 58 are different for each group of cylinders 22 and 24. The distributors are in communication with the ECU 58 so that the ECU 58 may control spark advancing.

The operation of the variable displacement engine 20 will now be described with reference to FIGS. 1–3, 7A–7B and 8. Once the engine 20 has been started, the engine control routine 800 of the ECU 58 begins. As was described in detail above, the ECU 58 obtains engine operating parameter data from the plurality of sensors 36 and determines from this data whether the engine 20 is operating under part or full load. If the ECU 58 determines that the engine is operating under part-load condition, the ECU 58 deactivates the fuel injectors 250 associated with the variably operated cylinder group 22 so that fuel is not supplied to the cylinders 80*a*–80*f*. At this time, however, the invariably operated group of cylinders 24 are fully operational.

During part-load operation, pistons of the invariably operated cylinders drive the crankshaft as each cylinder operates. The exhaust gas from the combusted mixture is supplied to the turbine of the turbocharger to drive the turbine, which in turn, drives the compressor to compress incoming air. Compressed air from the turbocharger is then supplied via the first intake plenum and runners to the variably operated cylinders 22.

With compressed air being supplied to the variably operated cylinders 22 during part-load operation, the four strokes of one of the variably operated cylinders 22 will now be described in detail. However, it will be appreciated that each cylinder of the variably operated cylinder group operates in a like manner. The cylinder utilizes a four stroke combustion cycle to convert fuel into rotary motion. The four strokes of the combustion are the intake stroke, the compression stroke, the combustion stroke, and the exhaust stroke. At the start of the intake stroke, the piston starts at the top of the cylinder (top dead center), and the intake valves 136 open. Once the intake valves 136 open, compressed air from the turbocharger 180 is forced into the cylinder above the piston, causing the piston to move downwardly to the bottom of the cylinder. The compressed air acting against the piston generates a quantity of positive torque to the crankshaft 86 causing the crankshaft 86 to rotate. As the intake valves 136 open, compressed air is forced into the cylinder resulting in minimal pumping losses.

The second stroke, or compression stroke, begins with the piston at the bottom of the cylinder (bottom dead center). During the compression stroke, the intake valves 136 and the exhaust valves 138 are closed. As the invariably operated cylinders rotate the crank due to their continuously active operation, the piston reciprocates upwardly to compress the air trapped in the cylinder. During this stroke, the engine must work to compress the above atmospheric air in the cylinder. The third stroke, usually referred to the combustion stroke, begins with the piston located at the top of the cylinder (top dead center), and both the intake and exhaust valves 136 and 138 in the closed position. Since fuel is not mixed with the air during part-load operation, combustion does not take place. Accordingly, as the piston translates downwardly as the crankshaft 86 rotates, the compressed air re-expands, thereby producing energy substantially equal to the energy used in the second stroke. One of ordinary skill in the art would appreciate that the total energy generated by the second and third stroke would be equal to zero minus heat loss generated by the friction of the piston.

The fourth stroke, commonly referred to as the exhaust stroke, begins when the piston hits the bottom of the cylinder (bottom dead center). At this time, the exhaust valves 138 open and the expanded air within the cylinder is pushed out into the exhaust manifold as the piston reciprocates upward to the top of the cylinder. At this point, the piston is in position to begin the four stroke cycle again.

As was discussed above with reference to the engine cooling system, fluid is prohibited from circulating via thermostat control through the variably operated group of cylinders 22 during part-load operation. This allows the friction generated during the first-fourth stroke to slightly heat the chambers. Additionally, the intercooler 242 formed by the tubes within the first intake plenum 20 drains coolant during part-load operation so that heat generated by compressing air further heats the variably operated cylinders 22. When the ECU determines that the engine should be operated during full load, and fuel is delivered to the working chambers to achieve combustion, fuel efficiency is improved since the variable group of cylinders are at operational temperatures.

As was described above, the ECU 58 continues to determine if the engine 20 should be operating in full-load operation. Once the ECU 58 receives engine operating parameter data that corresponds to full-load operation, the ECU transmits a representative signal to the fuel injection system 34. The fuel injection system 34 receives a signal from the ECU 58, and activates fuel delivery to the variably operated cylinder group 22. As the fuel injectors 250 inject fuel into the air supplied by the turbocharger 180, the cylinders 80a–80f of the variably operated cylinder group 22 operate in a typical four stroke combustion cycle to produce torque to the crankshaft 86.

Figure 4:
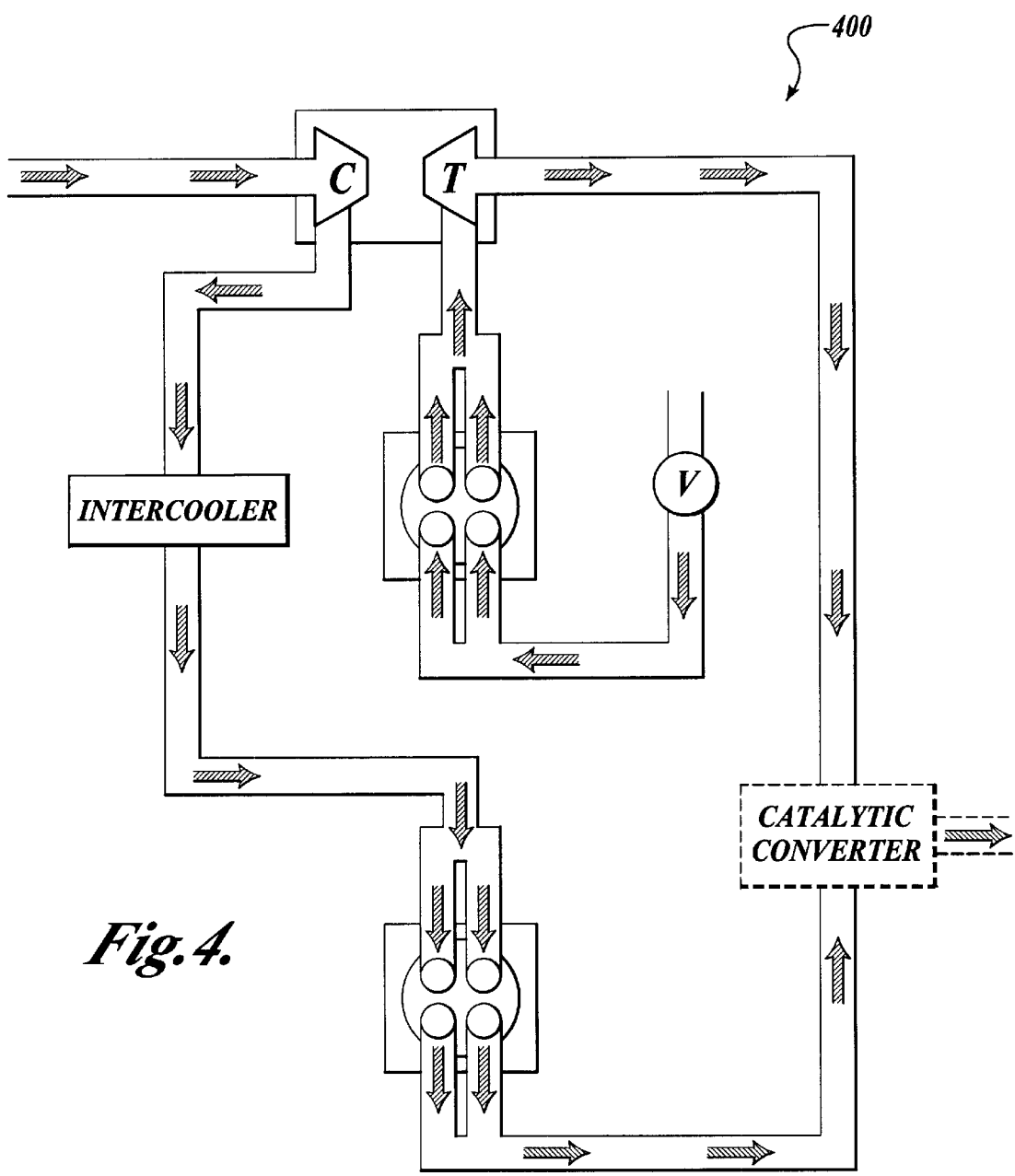
FIG. 4 is a schematic representation of an alternative embodiment of a variable displacement engine having two cylinders.
Figure 5:
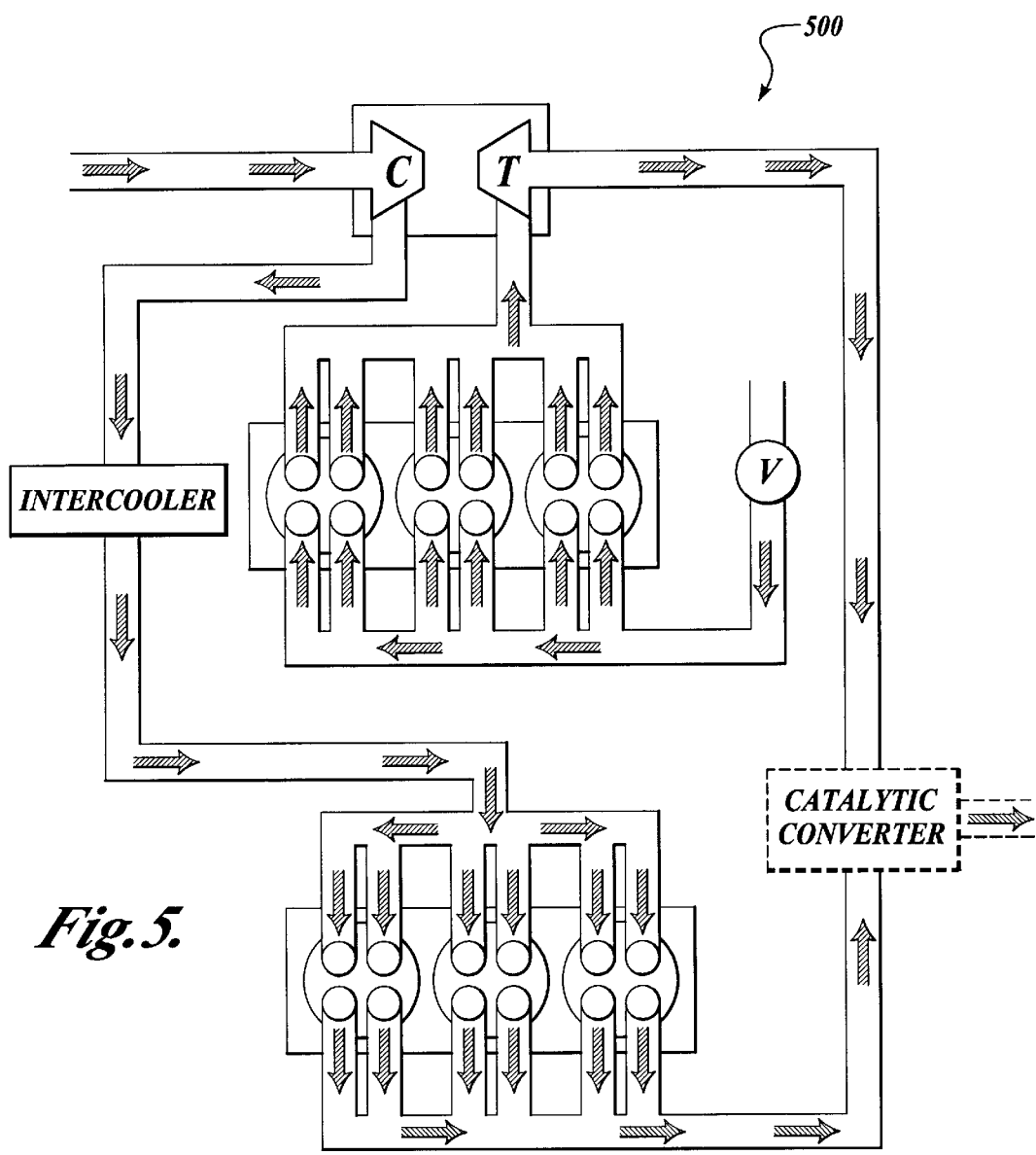
FIG. 5 is a schematic representation of another alternative embodiment of a variable displacement engine having six cylinders.
Figure 6:
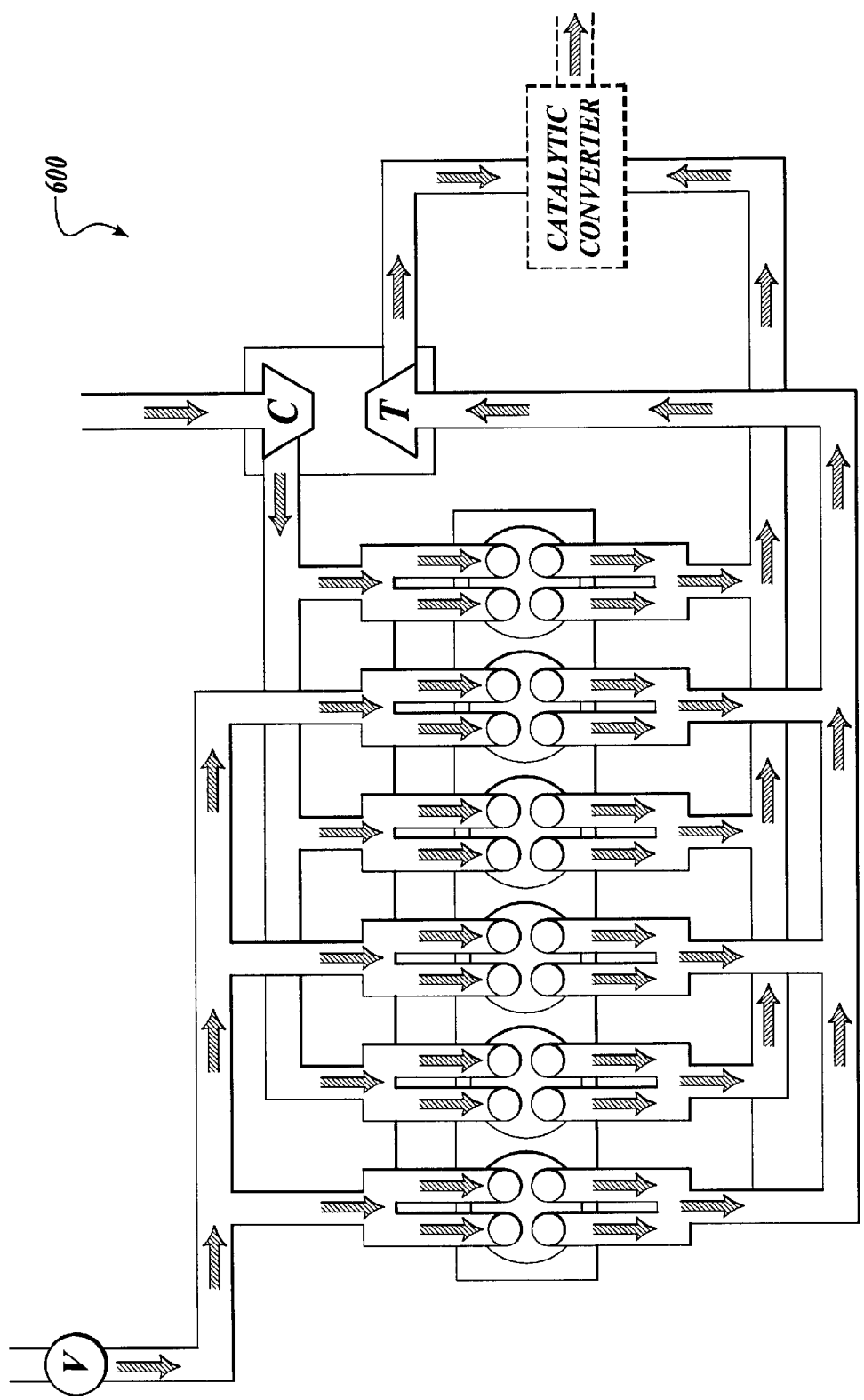
FIG. 6 is a schematic representation of yet another alternative embodiment of a variable displacement engine having six cylinders in an in-line configuration.

While the variable displacement engine described above and illustrated herein utilizes twelve cylinders, six cylinders in each of the invariably operated and variably operated groups of cylinders, it will be readily evident that any number of cylinders may be utilized by each of the invariably operated and variably operated groups of cylinders. This may include both an even and odd number of total cylinders, e.g., a 5 or 6 cylinder engine, and unequal numbers of cylinders divided into the invariably and variably operated groups, e.g., the invariably operated cylinders having 6 cylinders, and the variably operated having 4. For other examples, embodiments of a two cylinder engine 400, and a six cylinder engine 500 are shown schematically in FIGS. 4 and 5, respectively. Additionally, while the variable displacement engine described above and illustrated herein has a V-type configuration, it will be readily evident that other engine configurations may be practiced in accordance with the present invention, such as opposed or boxer-type, or inline engine 600, as shown schematically in FIG. 6.

As will be readily evident from the above description, a variable displacement engine constructed in accordance with aspect of the present invention provides many advantages of the prior art, a few which will now be discussed. First, by arranging the turbocharger to supply compressed air to the variably operated cylinders, the compressed air overcomes the energy lost to friction between the piston and the cylinders walls, and provides positive mechanical energy to the crankshaft during part-load operation. During full-load operation, the aforementioned turbocharger arrangement provides a turbocharged group of cylinders to provide additional power so that the engine may adequately operate in the loaded state. Furthermore, since the turbocharger is operated by the invariably operated cylinders, the turbocharger is always producing an amount of compressed air to the variably operated cylinders. Accordingly, during full-load operation when fuel is supplied to the compressed air, power is instantly realized without the effects of turbocharger lag.

Additionally, by the aforementioned arrangement of the turbocharger, a conventional waste gate is eliminated by the present invention. Accordingly, the lost power experienced in conventional arrangements that utilize waste gates to bypass the turbine, is recaptured by the arrangement of the present invention. Furthermore, this arrangement causes the turbocharger to produce boost in an approximately linear fashion, resulting in a more efficient operational range for the turbocharger.

Figure 9:
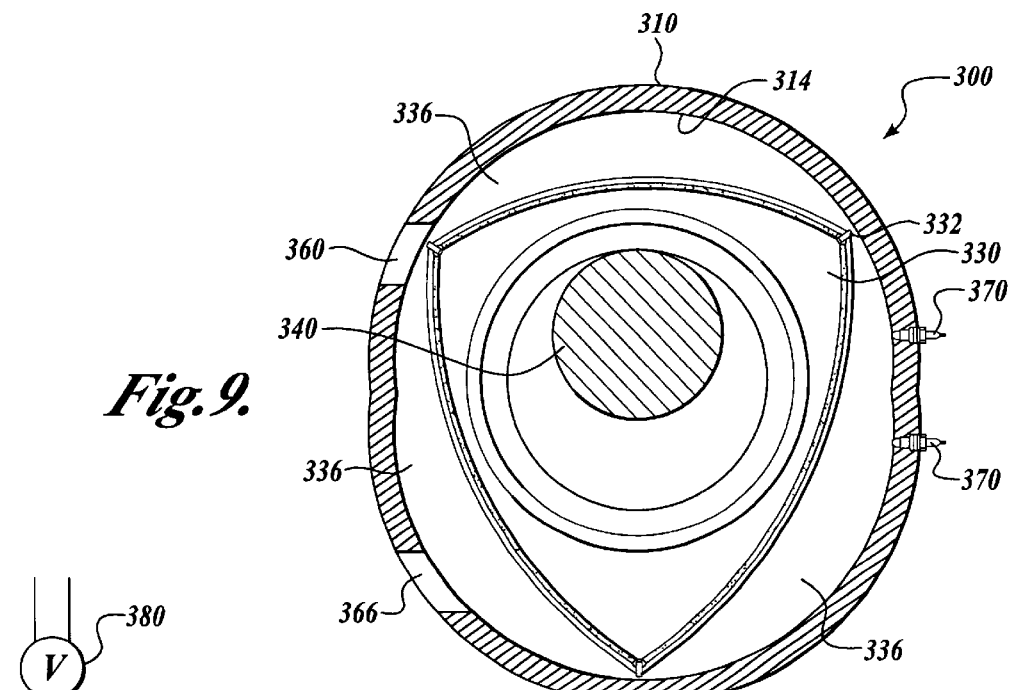
FIG. 9 is a cross-sectional view of a rotary piston variable displacement engine constructed in accordance with aspects of the present invention.
Figure 10:
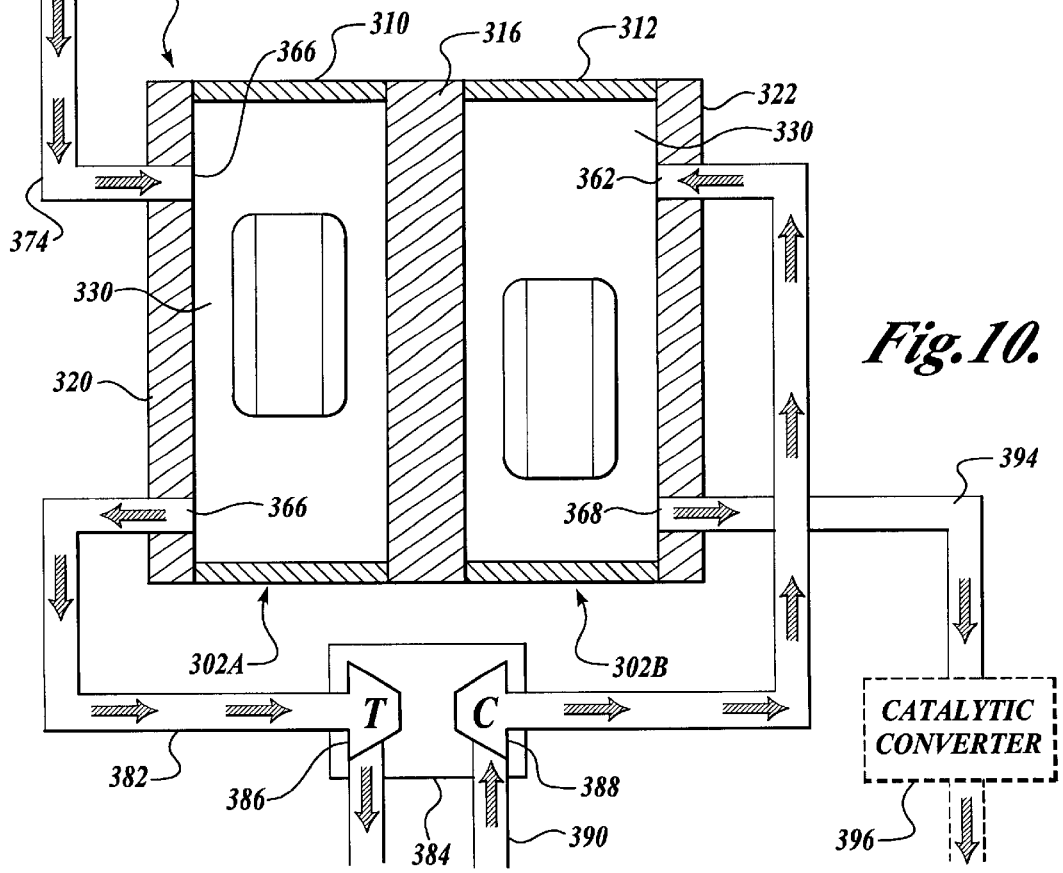
FIG. 10 is a side view of the rotary piston variable displacement engine of FIG. 9.

While the present invention has been described above and illustrated herein as an internal combustion engine utilizing reciprocating pistons to generate power to the output shaft, the invention operates equally well in a Wankel-type rotary engine configuration. In accordance with aspects of the present invention, a twin rotary variable displacement engine is shown in FIGS. 9 and 10, and schematically in FIG. 11. The twin rotary variable displacement engine 300 is provided with a variably operated rotary unit 302b which is controllable to start and stop operation under predetermined operating conditions, and an invariable operated rotary unit 302a which is constantly in operation irrespective of the operating condition. The engine 300 is operably connected to a variable displacement control system operable to deactivate the operation of the variably operated rotary unit 302b under predetermined operating conditions, such as idling, highway cruising speeds, and the like, so that the overall fuel efficiency of the engine is improved.

The engine 300 is controlled via the variable displacement control system 30 described above with reference to FIGS. 7A and 7B. The variable displacement control system 30 is operable to deactivate the variably operated rotary unit 302b during part-load operation, and is operable to permit both rotary units 302a and 302b to operate during full-load operation. The engine control routine 800 described above and illustrated in FIG. 8, may be utilized to control the operation of the engine 300, so that the engine may operate using invariably and variably operated rotary units 302a and 302b during full-load operation, and invariably operated rotary units 302a during part-load operation.

Figure 11:
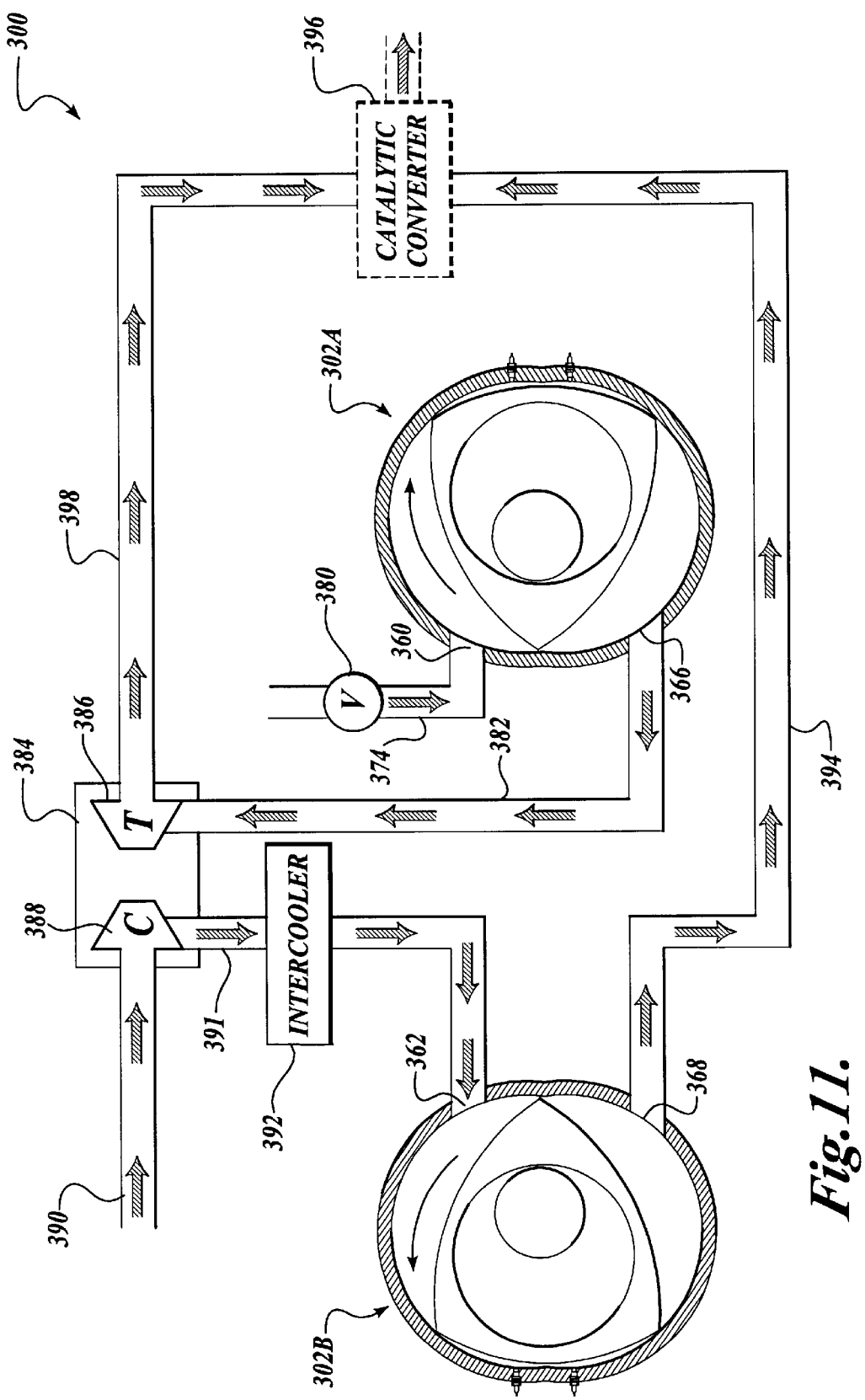
FIG. 11 is a schematic representation of the rotary piston variable displacement engine of FIG. 9.

Referring now to FIGS. 9–11, there is shown a two rotor type rotary piston engine 300 including invariably operated and variably operated rotor units 302a and 302b, respectively. The rotary piston engine 300 includes a casing 308 which comprises rotor housings 310 and 312 each having an inner wall surface 314 of a epitrochoidal configuration, an intermediate housing 316 located between the adjacent rotor housings 310 and 312, and a side housing 320 and 322 attached to the outer side surface of each outer rotor housing 310 and 312. Thus, for the rotor unit 302a, a rotor cavity is defined by the rotor housings 310, the intermediate housing 316 and the side housing 320. Similarly, a rotor cavity is defined for the rotor unit 302b by the rotor housing 312, the intermediate housing 316, and the side housing 322. In each of the rotor cavities, there is disposed a rotor 330 of a substantially triangular configuration for rotation with apex portions 332 in sliding contact with the inner wall surface 314 of the rotor housing 310 and 312. Thus, there are defined three working chambers 336 in each rotor cavity. The rotors 330 are carried by an eccentric shaft 340 so that the rotors 330 are rotated with a phase difference of 180° in terms of angle of rotation of the eccentric shaft 340. Positioned adjacent to the eccentric shaft is an engine speed sensor 38 for sensing the speed of the engine.

Referring now to FIGS. 10 and 11, side housings 320 and 322 are formed with intake ports 360 and 362, respectively, which open to the rotor cavities of the rotor units 302a and 302b, respectively. The side housings 320 and 322 also include exhaust ports 366 and 368 which open to the rotor cavities for the rotor units 302a and 302b. Ignition plugs 370 are mounted on each of the rotor housings. The intake port 360 is connected with an individual intake passage 374 which leads to a source of fresh air. The intake passage 374 is provided with an air flowmeter and a throttle valve 380. A throttle position sensor 40 monitors the throttle valve 380 and transmits data to the ECU 58. A fuel injector (not shown) is provided with the rotary unit 302a to deliver fuel to the passage 374.

As best shown FIGS. 10 and 11, the exhaust port 366 of the invariably operated rotary unit 302a is connected to a passageway 382, which feeds an inlet of a turbocharger 384. The turbocharger 384 includes a turbine 386, the inlet of which is in fluid communication with the passageway 382 to receive exhaust gas. The turbine 386, driven by the exhausted gases, in turn, drives a compressor 388. Fresh air is taken in via air line 390, and is compressed via the compressor 388 of the turbocharger 384. The compressed air from the compressor 388 is supplied to the intake port 362 of the variably operated rotary unit 302b via passageway 391. A fuel injector (not shown) is provided to deliver fuel to the passage 391. In the embodiment shown, the compressed air travels through an intercooler 392, to reduce the temperature of the compressed air.

Figure 12:
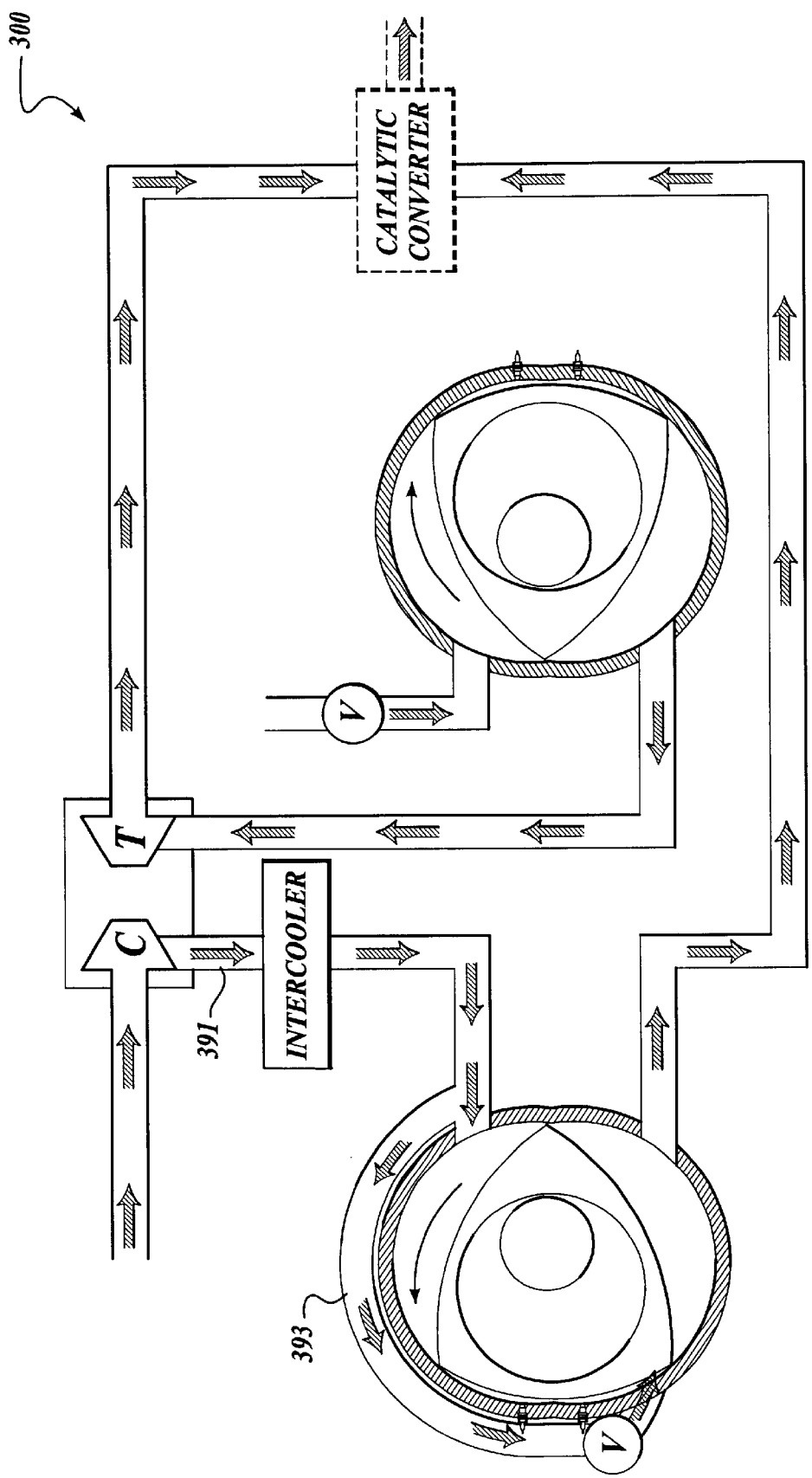
FIG. 12 is a schematic representation of an alternative embodiment of the rotary piston variable displacement engine of FIG. 9.

In an alternative embodiment shown in FIG. 12, an additional passageway 393 may be included that is in communication with the passageway 391. The passageway 393 is operable to supply compressed air to the combustion working chamber of the rotary unit 302b. The passageway is controlled via a control valve V, and is operable to attain an open position when said engine 300 is in the part-load condition. The valve V is in a closed position when the engine 300 is in its full-load operation.

Referring back to FIGS. 10 and 11, a passageway 394 is connected to the exhaust port 368 of the variably operated rotary unit 302b to transports exhaust gas produced from combustion of an air/fuel mixture in the working chambers of the variably operated rotary unit 302b to a catalytic converter 396, when the engine is operating in full-load condition. The catalytic converter 396 may also receive exhaust gas from the output side of the turbine 386 located at the turbocharger 384 via passageway 398. Upstream oxygen sensors 50, such as a heated exhaust gas oxygen (HEGO) sensors, positioned upstream of the catalytic converter 396, detects the oxygen content of the exhaust gas generated by the engine 300 and transmits a representative signal to the ECU 58. The signal is then used by the ECU in controlling the amount of fuel delivered to the engine 300 by the fuel injection system 34.

The operation of the twin rotary variable displacement engine 300 will now be described with reference to FIGS. 9–11. Once the engine 300 has been started, the engine control routine 800 of the ECU 58 begins. As was described in detail above, the ECU 58 obtains engine operating parameter data from the sensors and determines from this data whether the engine 300 is operating under part or full load. If the ECU 58 determines that the engine is operating under part-load condition, the ECU 58 deactivates the fuel injectors associated with the variably operated rotary unit 302b so that fuel is not supplied to the working chambers. At this time, however, the invariably operated rotary unit is fully operational.

During part-load operation, the rotor 330 of the invariably operated rotary unit 302a drives the eccentric shaft via the combustion cycle of the unit 302a. The exhaust gas from the combusted mixture is supplied to the turbine 386 of the turbocharger 384 to drive the turbine, which in turn, drives the compressor 388 to compress incoming air from inlet 390. Compressed air from the turbocharger 384 is then supplied via passageway 391 to the variably operated rotary unit 302b.

With compressed air being supplied to the variably operated rotary unit 302b during part-load operation, the compressed air continually forces the rotor to rotate, thereby providing positive work to the system. In the embodiment having the additional passageway 393, the control valve V is open only during part-load operation to help aid in forcing the rotor to rotate. Once the routine 800 determines that the engine 300 is in full-load, the valve is closed and fuel is supplied via fuel injectors to the variably operated rotary unit 302b. Thus, the rotary unit 302b begins the four stroke combustion cycle of a rotary unit.

While the preferred embodiment of the invention has been illustrated and described, it will be appreciated that various changes can be made therein without departing from the spirit and scope of the invention. For example, the various embodiments of the present invention utilized a variable displacement control system to deactivate one cylinder (or rotary unit) or a group of cylinders so that the engine can operate on haft its cylinders (or rotary units) to conserve fuel. However, it is contemplated to be within the scope of the present invention to eliminate the variable displacement control system so that the engine always operates on its full complement of cylinders (or rotary units), but turbocharges only half of its complement of cylinders (rotary units).

The embodiments of the invention in which an exclusive property or privilege is claimed are defined as follows:

What is claimed is:

1. An internal combustion engine comprising:
a crankshaft;
a first cylinder including:
a first piston reciprocally movable within said cylinder to form a first working chamber, said first piston operably connected to said crankshaft;
at least one intake port adapted to be connected in fluid communication with a source of air; and
at least one exhaust port adapted to be connected to an exhaust manifold;
a second cylinder including:
a second piston reciprocally movable within said second cylinder to form a second working chamber, said second piston operably connected to said crankshaft;
at least one intake port and at least one exhaust port; and
a turbocharger operable for receiving exhaust gas from only said first cylinder and operable for supplying compressed air to said second cylinder, said turbocharger including an inlet in fluid communication with said first cylinder and an outlet in fluid communication with said second cylinder; and
an intercooler operably connected to said outlet of said turbocharger, wherein said intercooler includes tubes for circulating coolant, said tubes operably connected to an electric pump, said electric pump controllable to shut-off coolant flow through said intercooler.

2. The engine of claim 1, wherein said first working chamber has a compression ratio in the range of 6:1 to 9:1.

3. The engine of claim 1, wherein said second working chamber has a compression ratio in the range of 9:1 to 12:1.

4. An internal combustion engine comprising:
a first chamber operable for combustion;
a first piston movable within said first chamber;
a second chamber operable for combustion;
a second piston movable within said second chamber;
a turbocharger operable for receiving exhaust gas, and further operable for supplying compressed air, wherein said turbocharger is operably arranged such that said turbocharger receives exhaust gas from said first chamber, and supplies compressed air to said second chamber; and
a variable displacement control system for controlling the operation of said first and second chambers, said system operable to operate said first and second chambers during full-load operation, and operable to deactivate said second chamber during part-load operation, wherein said second chamber is maintained at an operational temperature during part-load operation.

5. The engine of claim 4, wherein said first and second movable pistons are reciprocally movable within said respective first and second chambers.

6. The engine of claim 4, wherein said first and second movable pistons are rotatably movable within said respective first and second chambers in the form of rotors, said engine operating as a rotary piston engine.

7. The engine of claim 4, wherein said variable control system includes an engine control unit in communication with at least one sensor.

8. The engine of claim 7, wherein said at least one sensor is a plurality of sensors.

9. The engine of claim 8, wherein said plurality of sensors are any sensors selected from the group consisting of an engine speed sensor, a throttle position sensor, an engine temperature sensor, an oxygen sensor, an intake air pressure sensor, and an air flow sensor.

10. The engine of claim 9, wherein said plurality of sensors produces signals corresponding to an engine operating parameters.

11. The engine of claim 10, wherein said engine control unit receives a signal from any one of said plurality of sensors or combinations thereof and controls the operation of said fuel injection system based on said signal.

12. The engine of claim 11, wherein said engine control unit determines the load status of said engine based on said signals obtained from said sensors, said load status of said engine being either full-load or part-load operation.

13. The engine of claim 12, wherein said engine control unit deactivates said second chamber when said engine control unit determines that said engine is in said part-load operation.

14. The engine of claim 12, wherein said engine control unit continues the operation of said first and second chambers when said engine control unit determines that said engine is in said full-load operation.

15. The engine of claim 4, further comprising an engine cooling system having at least one fluid pump for circulating fluid through said engine;
wherein said operational temperature of said second chamber is maintained by preventing circulation of said fluid through a portion of said engine associated with said second chamber during part-load operation.

16. The engine of claim 15, wherein said fluid pump is controllable to prevent circulation of said fluid through said portion of said engine during part-load operation.

17. An internal combustion engine comprising:
at least one first chamber operable for combustion and having at least one intake port and at least one exhaust port, and a first piston movable within said first chamber;
at least one second chamber operable for combustion and having at least one intake port and at least one exhaust port, and a second piston movable within said second chamber;
a turbocharger operable for receiving exhaust gas, and operable for supplying compressed air, wherein said turbocharger operably arranged such that said turbocharger receives exhaust gas from said first chamber, and supplies compressed air to said second chamber, and
a variable displacement control system for controlling the operation of said first and second chambers, said system operable to operate said first and second chambers during full-load operation, and operable to operate only said first chamber during part-load operation;
wherein said second chamber is maintained at an operational temperature.

18. The engine of claim 17, wherein said first and second movable pistons are reciprocally movable within said respective first and second chambers.

19. The engine of claim 17, wherein said first and second movable pistons are rotatably movable within said respective fist and second chambers in the form of rotors, said engine operating as a rotary piston engine.

20. The engine of claim 17, further comprising an ignition system.

21. The engine of claim 20, wherein said ignition system includes a distributor, a first spark plug associated with said first chamber, and a second spark plug associated with said second chamber.

22. The engine of claim 17, wherein said second chamber exhaust port is connected in fluid communication to a catalytic converter.

23. The engine of claim 17, wherein said turbocharger includes an inlet in fluid communication with said first chamber and an outlet in fluid communication with said second chamber; wherein said engine further comprises an intercooler operably connected to said outlet of said turbocharger, said intercooler including tubes for circulating coolant, wherein said tubes are operably connected to an electric pump, said electric pump controllable to shut-off coolant flow through said intercooler.

24. An internal combustion engine comprising:
- at least one first chamber having at least one intake port and at least one exhaust port, and a first piston movable within said first chamber;
- at least one second chamber having at least one intake port and at least one exhaust port, and a second piston movable within said second chamber;
- a turbocharger operable for receiving exhaust gas from said first chamber and operable to supply compressed air to said second chamber,
- a variable displacement control system for controlling the operation of said first and second chambers during predetermined operating conditions to operate said first and second chambers during full-load operation and to interrupt the operation of said second chamber during part-load operation, said system including an engine control unit in communication with at least one sensor operable to output a signal corresponding to engine operating conditions and a fuel injection system in communication with said engine control unit, said fuel injection system operable to deliver fuel to said second chamber based on said signal of said sensor; and
- an engine cooling system having at least one fluid pump for circulating fluid through said engine, wherein circulation of said fluid through a portion of said engine associated with said second chamber is prevented during part-load operation.

25. The engine of claim 24, wherein said first and second movable pistons are reciprocally movable within said respective first and second chambers.

26. The engine of claim 24, wherein said engine control unit controls said fuel injector system so that said second chamber does not receive a supply of fuel when said engine control unit determines that said engine is in said part-load condition so as to deactivate said second chamber.

27. The engine of claim 24, wherein said engine control unit determines whether said engine is in part-load or full-load condition based on said signal obtained from said sensor.

28. The engine of claim 27, wherein said engine control unit controls said fuel injector system so that said second chamber does not receive a supply of fuel when said engine control unit determines that said engine is in said part-load condition so as to deactivate said second chamber.

29. The engine of claim 27, wherein said engine control unit controls said fuel injection system to supply fuel to said first and second chambers when said engine control unit determines that said engine is in said full-load condition.

30. An internal combustion engine comprising:
- at least one first chamber operable for combustion and having at least one intake port and at least one exhaust port, and a first piston movable within said first chamber;
- at least one second chamber operable for combustion and having at least one intake port and at least one exhaust port, and a second piston movable within said second chamber;
- a turbocharger operable for receiving exhaust gas, and operable for supplying compressed air, wherein said turbocharger operably arranged such that said turbocharger receives exhaust gas from said first chamber, and supplies compressed air to said second chamber,
- a variable displacement control system for controlling the operation of said first and second chambers, said system operable to operate said first and second chambers during full-load operation, and operable to operate only said first chamber during part-load operation, wherein circulation of said fluid through a portion of said engine associated with said second chamber is prevented during part-load operation; and
- an engine cooling system having at least one fluid pump for circulating fluid through said engine, wherein circulation of said fluid through a portion of said engine associated with said second chamber is prevented during part-load operation.

31. The engine of claim 30, wherein said fluid pump is controllable to prevent circulation of said fluid through said portion of said engine during part-load operation.

32. The engine of claim 31, wherein said fluid pump is an electric fluid pump.

33. An internal combustion engine comprising:
- at least one first chamber operable for combustion and having at least one intake port and at least one exhaust port, and a first piston movable within said first chamber;
- at least one second chamber operable for combustion and having at least one intake port and at least one exhaust port, and a second piston movable within said second chamber;
- a turbocharger operable for receiving exhaust gas, and operable for supplying compressed air, wherein said turbocharger includes an inlet in fluid communication with said first chamber and an outlet in fluid communication with said second chamber;
- a variable displacement control system for controlling the operation of said first and second chambers, said system operable to operate said first and second chambers during full-load operation, and operable to operate only said first chamber during part-load operation; and
- an intercooler operably connected to said outlet of said turbocharger, said intercooler including tubes for circulating coolant, wherein said tubes having a control valve disposed therein controllable to shut-off coolant flow through said intercooler.

34. An internal combustion engine having part-load and full-load operation, comprising:
- at least one first chamber which continuously operates during part-load and full-load operation;
- at least one second chamber which operates during full-load operation and does not operate during part-load operation, wherein said second chamber is maintained at an operational temperature during said part-load operation; and
- a turbocharger having an inlet for receiving exhaust gas and an outlet for supplying compressed air, said turbocharger operably arranged such that said inlet receives exhaust gas from said first chamber, and said outlet supplies compressed air to said second chamber.

35. The engine of claim 34, further including pistons movable within said first and second chambers.

36. The engine of claim 35, wherein said first and second movable pistons are either reciprocally or rotatably movable within said respective first and second chambers.

37. The engine of claim 34, further comprising an engine cooling system having at least one fluid pump for circulating fluid through said engine, wherein circulation of said fluid through a portion of said engine associated with said second chamber is prevented during part-load operation for maintaining the operational temperature of said second chamber.

38. The engine of claim 37, wherein said fluid pump is controllable to prevent circulation of said fluid through said portion of said engine during part-load operation.

* * * * *

UNITED STATES PATENT AND TRADEMARK OFFICE
CERTIFICATE OF CORRECTION

PATENT NO. : 6,640,543 B1
DATED : November 4, 2003
INVENTOR(S) : M.R. Seal

It is certified that error appears in the above-identified patent and that said Letters Patent is hereby corrected as shown below:

Title page,
Item [57], ABSTRACT,
Line 15, "variable operated cylinders." should read -- variably operated cylinders. --

Column 15,
Line 12, do not indent "a second cylinder including:"

Column 16,
Line 39, "turbocharger operably" should read -- turbocharger is operably --
Line 41, "said second chamber," should read -- said second chamber; --
Line 54, "fist" should read -- first --

Column 17,
Line 15, "said second chamber," should read -- said second chamber; --
Line 63, "turbocharger operably" should read -- turbocharger is operably --
Line 65, "second chamber," should read -- second chamber; --

Signed and Sealed this

Fifth Day of April, 2005

JON W. DUDAS
*Director of the United States Patent and Trademark Office*